United States Patent [19]

Krawczyk

[11] Patent Number: 5,530,757

[45] Date of Patent: Jun. 25, 1996

[54] DISTRIBUTED FINGERPRINTS FOR INFORMATION INTEGRITY VERIFICATION

[75] Inventor: Hugo M. Krawczyk, Riverdale, N.Y.

[73] Assignee: International Business Machines Corporation, Armonk, N.Y.

[21] Appl. No.: 267,083

[22] Filed: Jun. 28, 1994

[51] Int. Cl.⁶ ............................... H04K 1/00; H04L 9/00
[52] U.S. Cl. ..................... 380/23; 380/25; 380/4; 380/49
[58] Field of Search .................... 380/23, 25, 4, 380/49

[56] References Cited

U.S. PATENT DOCUMENTS 4,908,861 3/1990 Brachtl et al. ............................ 380/25
5,050,212 9/1991 Dyson ...................................... 380/25

*Primary Examiner*—David C. Cain
*Attorney, Agent, or Firm*—Douglas W. Cameron

[57] ABSTRACT

A method and apparatus for determining when a original document has been altered. With this invention the original information in the document is hashed using a one-way hash function. The hashed information is then encoded into a number of fingerprint pieces which are then transmitted to a number of locations. To verify the originality of the document a minimum number of fingerprint pieces are decoded and the purported genuine document is hashed using the one-way hash function. If the results of the latter hash equal the results of decoding the minimum number of fingerprint pieces, then the purported document is accepted as the genuine document.

11 Claims, 5 Drawing Sheets

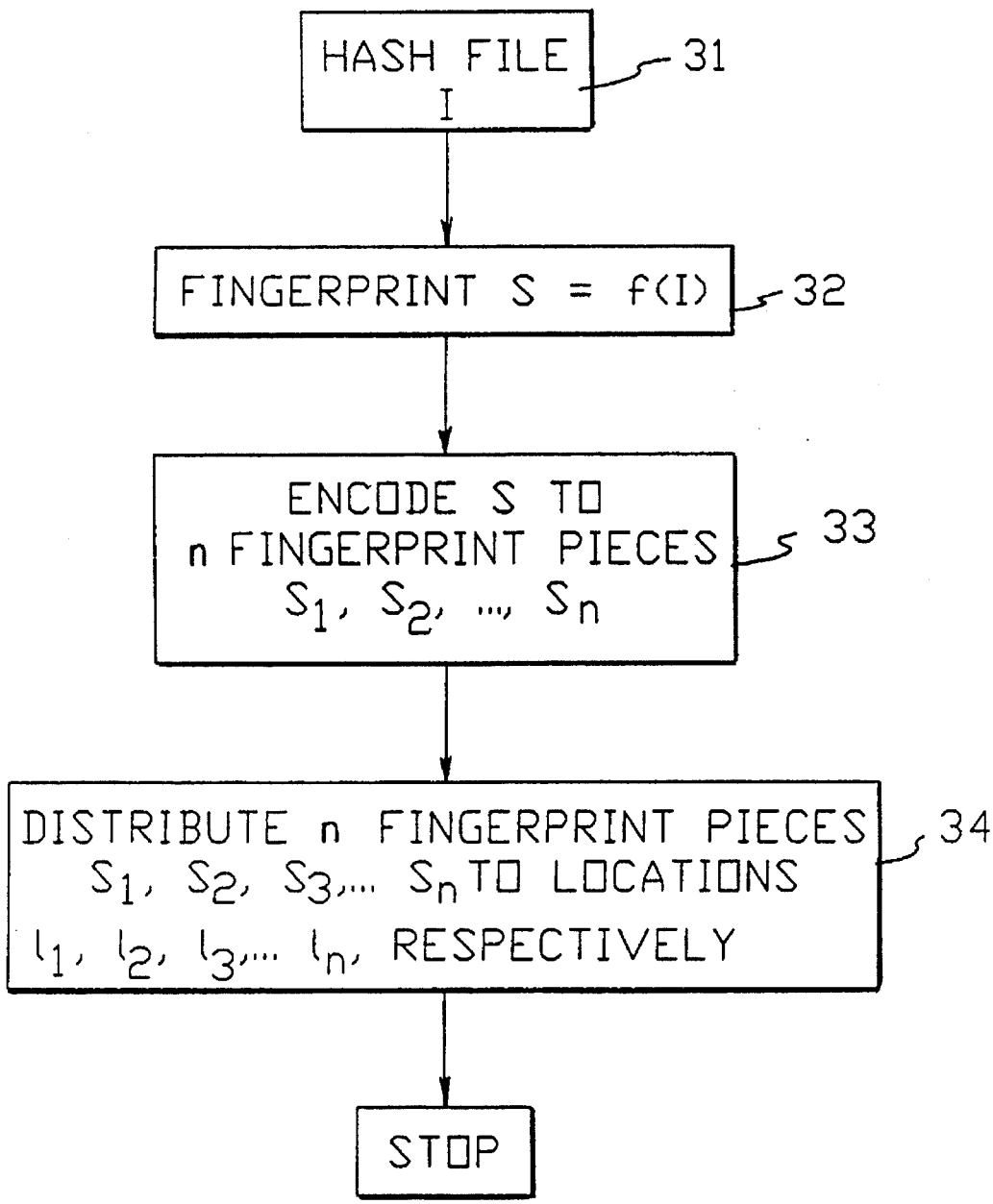

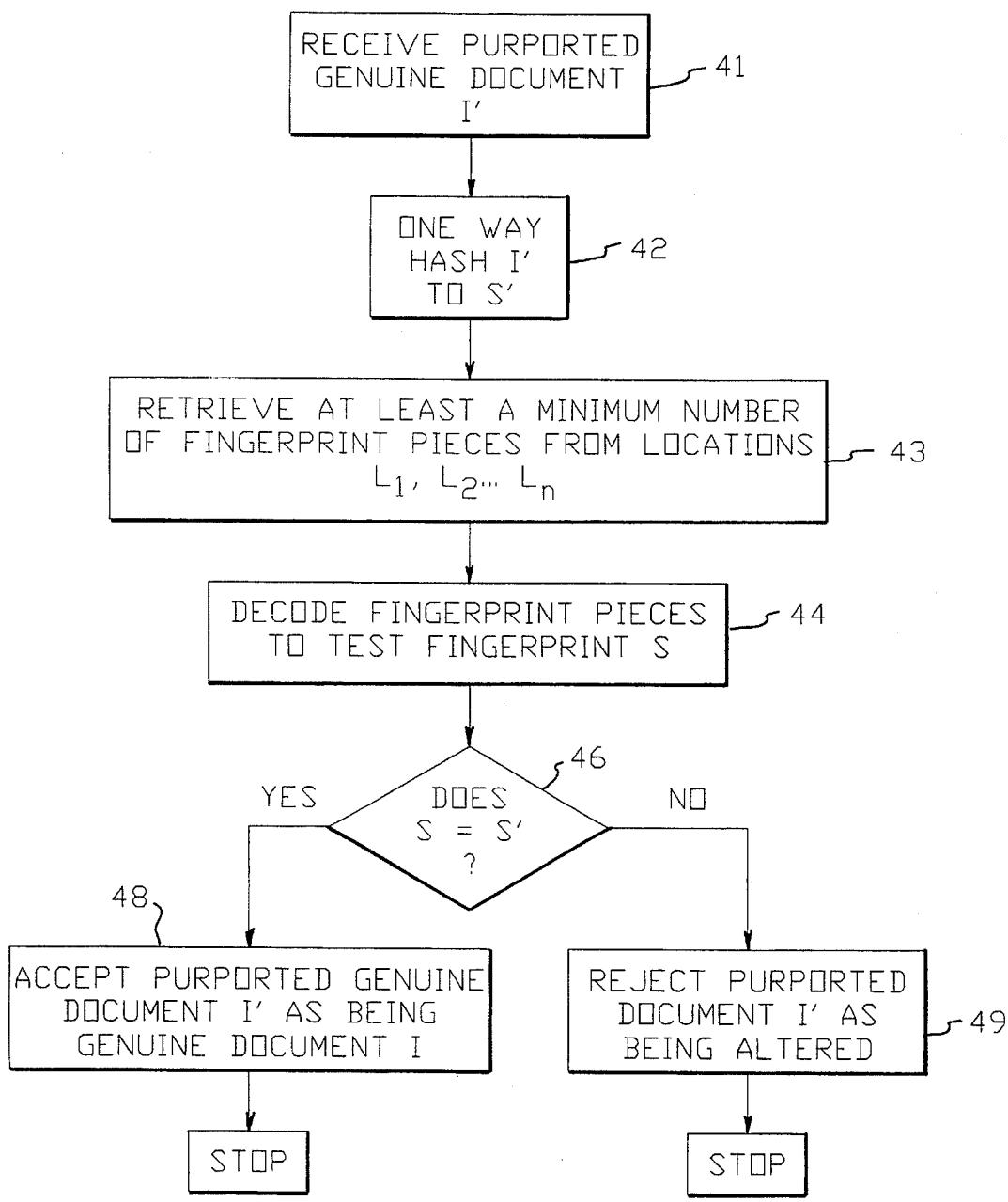

DISTRIBUTED FINGERPRINTS FOR INFORMATION INTEGRITY VERIFICATION

TECHNICAL FIELD

This invention relates to a method and apparatus for verifying the integrity of an original document stored in a computer or transmitted over a network, or alternately stated, for determining whether an original document has been altered.

DESCRIPTION OF THE PRIOR ART

Information stored (or transmitted) in a computer is exposed to integrity violation, e.g., the data can be changed by an unauthorized (possibly malicious) party. In many cases such a violation can have disastrous consequences. Examples include the (malicious) modification of a program or executable code (such a modification is usually referred to as a computer virus), modification of sensitive data, including administrative, financial, juridical and medical information; alteration of security information like user passwords or public-keys; personal user information; and so on.

Methods for integrity verification have been developed for years for the case of physical, non-malicious, errors [7]. In this case the adversary is a random or probabilistic process that does not adapt itself against a particular protection method. However, in the case of an intelligent and malicious adversary, protection is harder since this adversary may adapt its behavior to overcome any particular method of protection. In the latter case cryptographic means are required to protect against such an adversary. Indeed, cryptography has produced many schemes to fingerprint information such that an adversary cannot modify information without being detected. These methods rely on some "advantage" of the information owner(s) (which produce the necessary fingerprint) over the adversary; this advantage usually takes the form of some secret key known to the legitimate owners or users of the information but not to the adversary. See [9].

These fingerprinting methods are satisfactory for a variety of scenarios, but are hard to achieve in others. The main obstacle for a general application of these methods is how to share the secret information between the potential users. In particular, if the required secret information is shared between these users, any of them can become a malicious adversary with the ability to modify information. A legitimate user or computer can become corrupted because of its owner's personal interests or because of being attacked or breaked-in by an external adversary. A partial solution to this problem is provided by public-key cryptography [1] that requires no sharing of secrets, yet it requires different secrets (private keys) for different users and certification of the public-keys of other entities in the system for integrity verification, a requirement which usually involves the need for a trusted third party. It also requires time-stamping mechanisms, knowledge of originator information and computation of expensive operations (e.g., exponentiation modulo large numbers).

Methods for file integrity protection (as opposed to integrity verification) have also been proposed. A simple solution is to replicate the file on many sites in the system (e.g., one copy for each processor). To recover it, just collect all the versions and choose the one which appears a majority of times. With a majority of honest participants this guarantees the information availability. Clearly, this solution is very inefficient from space and communication point of view. In order to alleviate this problem in the scenario in which only fail-stop faults are allowed (i.e., some processors may fail to return their pieces of information but returned pieces are always unmodified), Rabin [5] invented his Information Dispersal Algorithm. This scheme gives a space efficient solution to the above problem in the fail-stop model of faults. In order to gain robustness against more general faults, Rabin proposed to fingerprint the distributed shares of information. Unfortunately, traditional fingerprint techniques require secret keys or a trusted central authority, or both, resulting in restrictions on the accessibility of the information and an undesirable complexity for the system.

Li Gong [8] presents a scheme for secret sharing using distribution of information and hashing. Gong, however, doesn't teach hashing the genuine document. With Gong shares of information arc generated, and each of those shares are of a size greater than or equal to the size of the genuine document. These shares are then hashed and secretly distributed to a number of locations. Since the goal of Gong is recovery and secrecy of the genuine document as opposed to verification of whether the document was actually altered, Gong requires a larger number of computations, secrecy and high bandwidth.

SUMMARY OF THE INVENTION

Thus, this invention provides a general method for integrity verification of information useful to detect the presence of computer viruses, verifies the authenticity of information residing in public or private storage or transmitted over a communication network, tests the correct reconstruction of information retrieved from different processors or servers, and so on. This invention involves no secrecy at all. With this invention, in order to modify the genuine document without detection, an attacker must be able to simultaneously modify information residing in multiple locations or entities of a computer system.

Accordingly this invention provides a method and apparatus for verifying the integrity of a genuine document. When initializing the document for possible future verification: the original information in the genuine document is hashed into a fingerprint using a one-way cryptographic hash function, then the fingerprint is encoded into a number of fingerprint pieces, and finally each of the fingerprint pieces are distributed to a number of locations. When the test document purported to be the original document and having test information is to be verified: a predetermined minimum number of test fingerprint pieces purported to be original fingerprint pieces are decoded into a first test fingerprint, the test information in the test document is hashed into a second fingerprint using the one-way hash function, and finally the first test fingerprint is compared with the second test fingerprint with the test document being accepted as the genuine document if the first and second test fingerprints are equal.

The assumption behind this invention is that the adversary might be able to read all of the locations where pieces are located, but can modify only a fraction (e.g., a minority) of them. This assumption is plausible in many cases. Examples of such locations include: separate memory disks, memory locations (partially) protected by hardware or software means against changes, the registers of one or more processors, different processors in a distributed or parallel environment, a group of users or servers, a data area and/or executable code of a computer program or a software package, and more. A server can be any computer or processor such as a work station or mainframe, etc. In general, the selection of locations for a particular implementation will depend on the kind of information being protected (e.g., whether it is a stored file, a computer program, executable code or a transmitted message), who needs to access the information (e.g., a single-user vs. multi-user environment), the computing environment (e.g., centralized, distributed, or parallel processors, client-server environments, a communication network, etc.), the storage medium (memory hierarchy, single or multiple disks, shared or distributed memory, transmitted messages or files, etc.), the trust relationships between different parts of the computing system (e.g., administration servers may be better trusted than general user computers), and so on. This invention provides a solution applicable to all of these scenarios. For illustration, consider the following examples.

Consider a file residing in a computer at a corporation's headquarters. In this case one can choose the locations for the fingerprint pieces to be computers in different sites of this corporation which are geographically apart, but communicated through a computer network. It is plausible to assume that is hard for an attacker to corrupt both the original file and also most of the other (far apart located) fingerprint pieces.

Consider a message transmitted from a party A to a party B. An adversary seating in tile line between A and B may be able to modify information in the message. One can use our invention to transmit not only the message but also the fingerprint pieces. If these pieces are routed differently than the main information then the ability of the adversary to modify the information without being detected is reduced significantly (not only is it required for the adversary to modify the original message but also a majority of tile fingerprint pieces). Our method will work even between A and B that never before exchanged any secret or authenticated information. All the existing methods for message authentication require such a prior communication between A and B.

Consider a software package (i.e. a collection of computer programs). These programs use information (data or executable code) whose undetected modification (e.g. by a virus) can have dangerous consequences. One can guard against these modifications by using distributed fingerprints on the sensitive information; in this case the fingerprint pieces can be located in different (possibly random) positions among the object code of the software package. The only way for the adversary, say a virus, to go undetected is to access most of these locations and change them.

The high flexibility of our method comes from its secrets-free nature and the consequent unnecessary secret key and confidentiality management. Moreover, the size of cryptographic fingerprints depends only on the level of security required against an adversary (e.g., depending on the computational resources of this adversary), and not on the length of the original information being fingerprinted. Thus, the amount of information being distributed into the different memory locations or computer entities is small. This is to be contrasted with methods that provide protection by distributing or replicating the entire information.

DESCRIPTION OF THE PREFERRED EMBODIMENT

Shown in FIG. 1 is a sample network topology in which the invention can be implemented. Shown is user terminal 10 and servers 20 at locations $l_1, l_2, \ldots, l_n$. As will be explained below, this invention has two phases: a fingerprinting or initialization phase, and a verification phase.

In the fingerprinting phase or initialization phase, terminal 10 hashes genuine document I with function f to a fingerprint. Then the encoder 4 (see FIG. 3) of terminal 10 encodes the fingerprint into n fingerprint pieces $S_1, S_2, \ldots, l_n$. These fingerprint pieces are then distributed from terminal 10 to locations $l_1$ through $l_n$ shown in FIG. 1.

FIG. 2 graphically illustrates the verification phase of the invention. In this illustration, terminal 10', which may or may not be terminal 10, receives x fingerprint pieces from locations $l_1, l_2, \ldots l_x$ where $t \leq x < n$. The parameter t will be explained below.

The locations $l_1, l_2, \ldots, l_x$ were merely chosen for case of illustration, actually any x locations may be chosen. Further, in this illustration, a purported original document I' is received from location $l_3$. As explained below, the fingerprint pieces received are then decoded into a first test fingerprint. A one-way hash function is then applied to purported genuine document I' to yield a second fingerprint. The two test fingerprints are then compared, and if the two fingerprints are equal, then the purported genuine document would be accepted as the genuine document I.

Again referring to FIG. 1, let I be a stream of information or a genuine document residing in a computer storage environment such as a memory of user terminal 10. In order to fingerprint this information for later integrity verification, we utilize a fingerprint function f, a pair of coding/decoding functions C and D and n locations (or entities) $l_1, \ldots, l_n$ in the computer system, where (short) pieces of information can be stored for later retrieval at time of verification. These locations can be memory locations, distributed processors, a set of servers, a group of users, etc. See FIG. 2.

The fingerprint function will typically be a cryptographic one-way hash function known to all parties in the system who participate in the generation or verification of information. Roughly speaking, such a fingerprinting function f is a hash function. (mapping long strings into much shorter ones) with the additional property that for any given string x it is hard to find another string y such that $f(x)=f(y)$.

The pair of coding/decoding functions (or procedures) C and D have the following properties. They are parameterized by three values: n, t, where $n/2 < t \leq n$, and k, is a positive integer. For any string S of length at most k, C(S) is a sequence of n strings $S_1, S_2, \ldots, S_n$ such that the decoding function D can reconstruct S from any set of x, where $t \leq x \leq n$, strings $S'_{i1}, S'_{i2}, \ldots, S'_{ix}$, as long as there are at least t indices $i_j$ for which $S'_{ij}=S_{ij}$. This pair of functions (C,D) is referred to as an (n, t)-error correcting code. The bound k is implicitly assumed; it is less relevant to our description since information longer than k can be treated as the concatenation of pieces of length k and coded separately.

Fingerprinting Phase

Before it is stored in user terminal 10, I (genuine document) is fingerprinted by the following steps (F1, F2, and F3):

F1. Compute f(I), where f is a one way hash Function as described above. For example, in FIG. 3, hasher 2 hashes file I in accordance with formula f(I).

F2. Compute $C(f(I))=S_1, S_2, \ldots, S_n$, for example, FIG. 3, For the encoder shown there.

F3. Distribute to each location $l_i$ in the system the corresponding piece $S_i$. For example, in FIG. 3, the output of the hasher, fingerprint S, is applied to encoder 4. The fingerprint pieces $S_1, S_2, \ldots, S_n$ appear on the outputs 4-1, 4-2, ..., 4-n of encoder and are delivered to locations $l_1, l_2, \ldots, l_n$. See also FIG. 1.

Verification Phase

At a later stage, whenever a party in the system needs to verify the integrity of that information it performs the following steps V1, V2, and V3:

V1. Retrieve from each location $l_i$, the corresponding fingerprint piece; denote the returned piece by $S'_i$. See FIGS. 2 and 3, where $S'_1, S'_2, \ldots, S'_x$ are retrieved from locations $l_1, l_2, \ldots, l_x$. Of course, any x fingerprint pieces of the n fingerprint pieces could be retrieved, where $t \leq x \leq n$. $S'_1, S'_2, \ldots, S'_x$ was chosen only for ease of illustration. It is assumed that I' is stored in terminal 10' after being retrieved.

V2. Compute $D(S'_1, S'_2, \ldots, S'_x)$ and f(I') where I' is the purported genuine document which may be different from the genuine document I. Shown in FIG. 3 are test fingerprint pieces $S'_1, S'_2, \ldots, S'_x$ being received from locations $l_1, l_2, \ldots, l_x$. Also shown, for example, is purported genuine document I' being received from S3. The retrieved test fingerprint pieces are then decoded with the decoder 3 into test fingerprint S'. Also purported genuine document I' is applied to hasher 2 where it is converted into a test fingerprint. The two test fingerprints are then compared by comparator 6. In this example, the hasher, the encoder, the decoder and the comparator are all part of user terminal 10.

V3 if compare S' with f(I') with comparator 6, and both computations agree, accept purported genuine document I' as being the genuine document I; otherwise, reject it as corrupted or altered.

Notice that as long as t (or more) of the retrieved pieces $S'_i$ are correct then f(I) is recovered correctly. Any replacement of I by a different I' will be detected since, due to the one-way property of f, it is extremely difficult to find an I' with same hash value as I.

The two components used in the above invention are one-way hash Functions and (n,t)-error correcting codes. This invention can use any of the many practical schemes available for realization of these functions. Examples of one-way hash functions are the MDC functions from [3], MD4 [6], and the recently proposed "secure hash standard" to be used in conjunction with the Digital Signature standard [4]. References [3], [4], and [6] are hereby incorporated by reference. The output length of these functions does not depend on the length of the information I. In practical applications, this length is 64 or 128 bits depending on the function and the required security. The 128 bit length is necessary for strong one-way hash functions, namely, those for which even the writer of the information cannot later corrupt the information. The practical candidates mentioned above are believed to be of this kind (for a distinction between weak and strong one-way hash functions see [1]).

As for (n, t)-error correcting codes, these functions are well-known from the theory of error correcting codes. See [2], which reference is also hereby incorporated by reference. There exist very efficient implementations of these functions, and they range from very simple schemes (as replication codes) to very sophisticated algebraic methods. With the replication codes, all fingerprint pieces are equal to the original fingerprint, and the reconstruction of the fingerprint is decided by the majority of tile retrieved fingerprint pieces. The latter algebraic methods, although being complex from the mathematical point of view, have very efficient realizations, which are particularly suitable for hardware implementation. Hardware implementation may be required in cases in which information transmitted or distributed at high speeds is being automatically fingerprinted. The total amount of information required for the distributed fingerprint (i.e., the result of C(f(I)) depends on the error correcting code in use. For example, using replication codes (as explained above) the total length of C(S)=C(f(I)) is n times the length of S, but can support t=n/2+1, (i.e., a simple majority, of uncorrupted locations). On the other hand, using Reed-Solomon codes, the scheme requires two thirds of the fingerprint pieces to be correct, but the total length of C(S) is significant smaller than the length of C(S) in the replication codes. In addition these codes have very efficient implementation.

The proposed scheme of this invention can be used in any computer system, in particular a distributed one, in which information has to be protected against unauthorized modification and which, at the same time, has to be accessible to many parties in the system. Our scheme by itself cannot avoid modification of the information, but it can detect such modifications.

FIG. 4 is a flow chart describing the initialization phase of the invention as described above. As previously described, steps 31–34 show the hashing of the genuine document by applying the one way hash function to produce a fingerprint, the encoding of the fingerprint into n fingerprint pieces, and finally the distribution of the fingerprint pieces to the n locations.

FIG. 5 is a flow chart describing the verification phase of tile invention as previously described. Steps 41–49 illustrate the receiving of the purported genuine document I', the application of the one way hash function to the latter document, the retrieval of at least a minimum number of fingerprint pieces from the locations, tile decoding of the fingerprint pieces into a test fingerprint, the comparison of the test fingerprint S with S', and finally the rejection or acceptance of the purported document as being the genuine document based upon the results of the comparison.

BRIEF DESCRIPTION OF THE DRAWINGS

FIG. 1 illustrates the distribution of the fingerprint pieces while FIG. 2 shows the retrieval of a number of fingerprint pieces.

FIG. 4 is a flow diagram illustrating the initialization phase of the invention.

FIG. 5 is a flow diagram illustrating the verification phase of the invention.

REFERENCES

Figure 1:
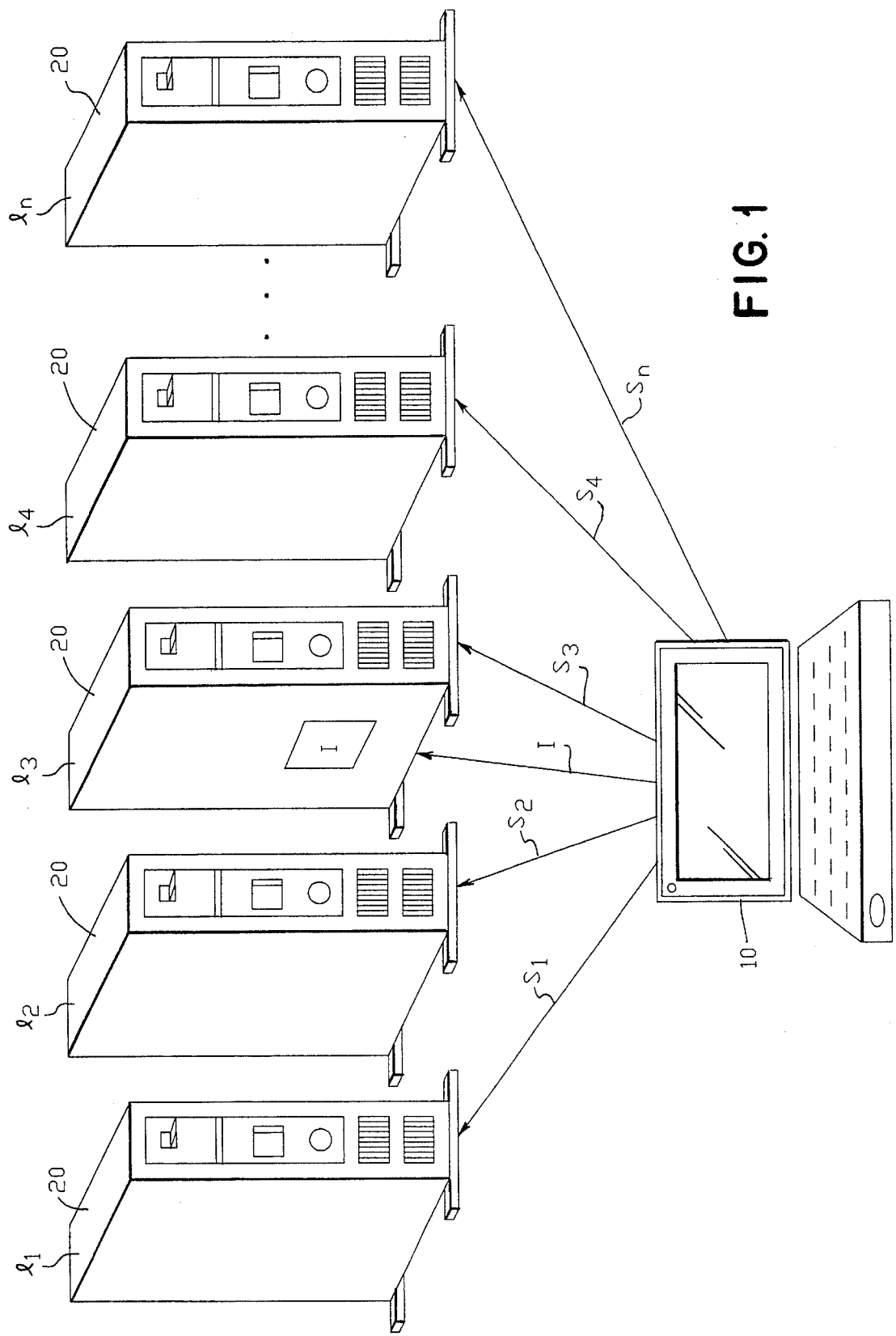
FIGS. 1 and 2 illustrate a sample network topology in which the invention is implemented.
Figure 2:
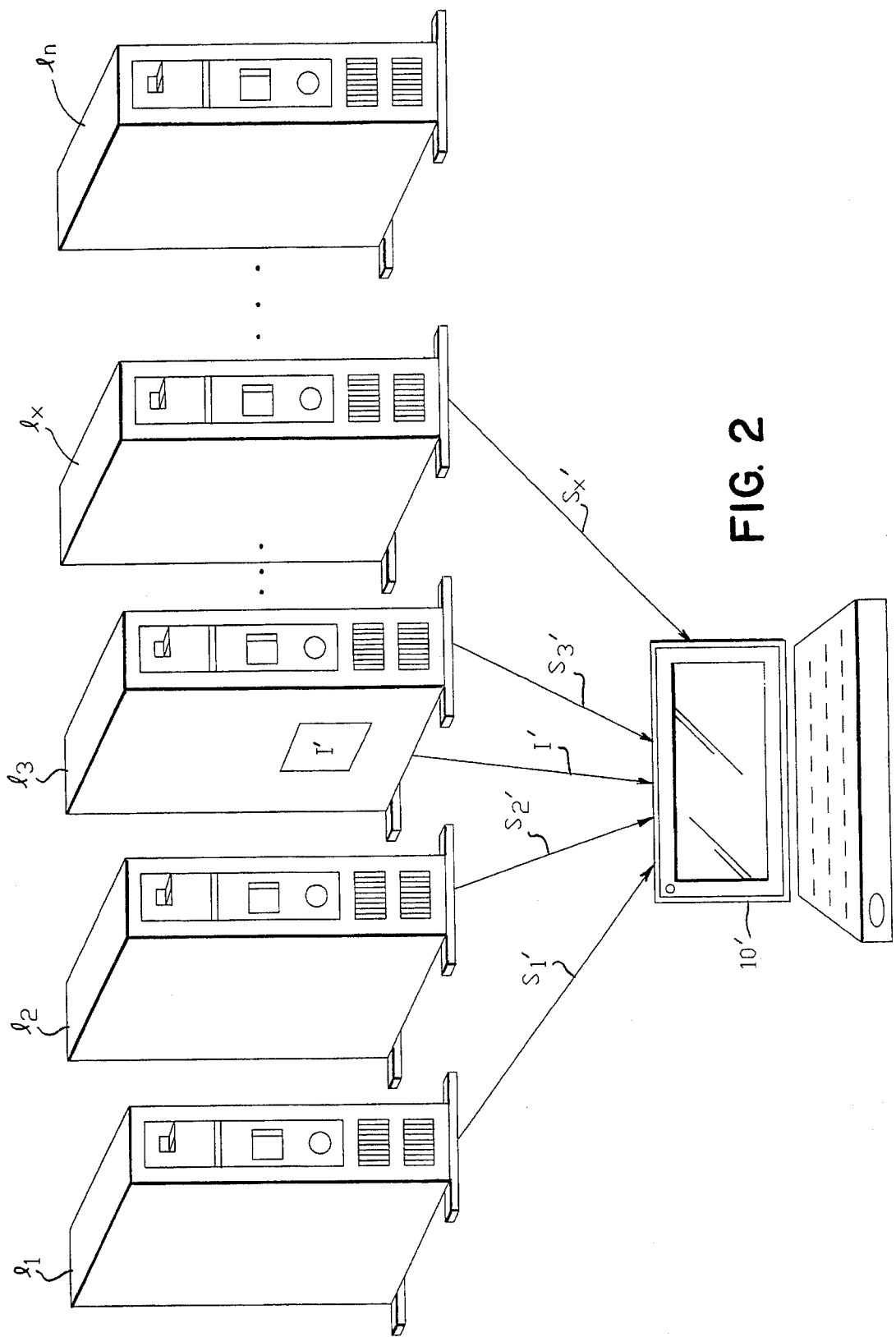
Figure 3:
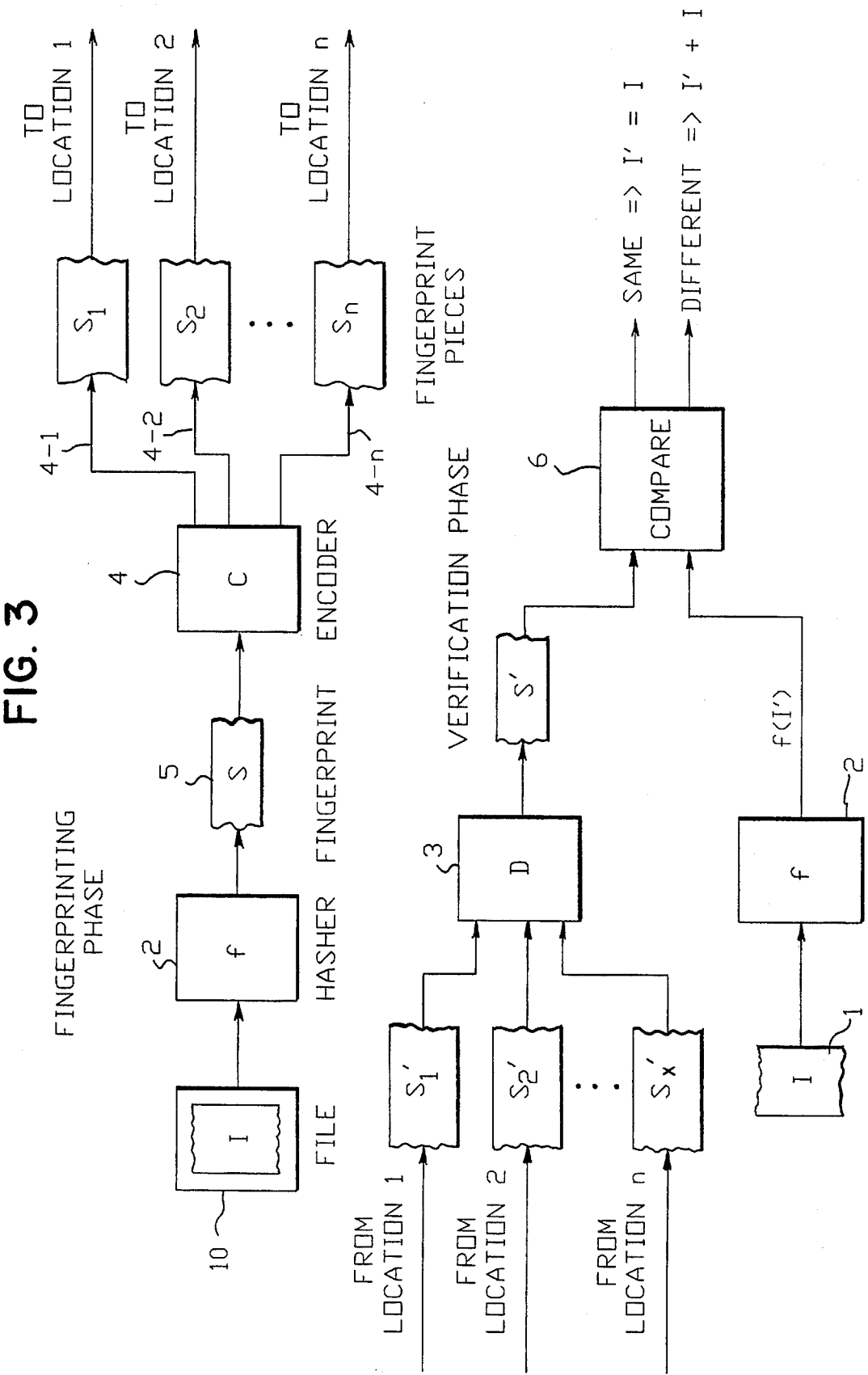
FIG. 3 is a schematic illustration of the hardware implementation of the invention.

[1] J. Nechvatal, *Public Key Cryptography*. In *Contemporary Cryptology*, edited by G. Simmons, IEEE Press 1992.

[2] R. Blahut, *Theory and Practice of Error Control Codes*, Addison-Wesley, 1984.

[3] B. O. Brachtal, D. Coppersmith, M. M. Hyden, S. M. Matyas, C. H. W. Meyer, J. Oseas, S. Pilpel and M. Shilling, "Data authentication using modification detection codes based on a public one-way encryption function", U.S. Pat. No. 4,908,861, issued Mar. 13, 1990.//(See also C. Meyer and M. Schilling, "Secure Program Load Using Manipulation Detection Code", Proceedings of Securicom, 1988).

[4] "Secure Hash Standard Draft", NIST, February 1992.

[5] M. O. Rabin, "Efficient Dispersal of Information for Security, Load Balancing, and Fault Tolerance", *Jour. of ACM*, Vol. 36, No. 2, 1989, pp. 335–348.

[6] R. L. Rivest, "The MD4 Message Digest Algorithm", Proc. Crypto '90.

[7] A. S. Tanenbaum, *Computer Networks*, Prentice-Hall, Englewood Cliffs, N.J. 1981.

[8] L. Gong, "Increasing Availability and Security of an Authentication Service," IEEE Journal on Selected Areas in Communications, Vol. 11, No. 5, June 1993, pp. 657–662.

[9] G. J. Simmons, "*A Survey of Information Authentication*", in Gustavos d. Simmons, editor, *Contemporary Cryptology, The Science of Information*, IEEE Press, 1992, pp. 379–419.

Having thus described our invention, what we claim as new and desire to secure by Letters Patents is:

1. A method of verifying the integrity of an original document having original information, said method comprising:

when initializing said original document for possible future verification:
 a) hashing said original information into a fingerprint using a one-way hash function;
 b) encoding said fingerprint into a plurality of original fingerprint pieces;
 c) distributing said original fingerprint pieces to a plurality of locations with each of said locations receiving at least one of said original fingerprint pieces;

when verifying the integrity of a test document purported to be said an original document and having test information:
 d) retrieving a first number of test fingerprint pieces purported to be said original fingerprint pieces from a plurality of said locations;
 e) decoding at least a predetermined number of said first number of test fingerprint pieces into a first test fingerprint;
 f) hashing said test information into a second test fingerprint using said hash function; and
 g) comparing said first test fingerprint with said second test fingerprint and accepting said test document as being said genuine document if said first test fingerprint equals said second test fingerprint.

2. A method as recited in claim 1, wherein each of said locations is a memory location.

3. A method as recited in claim 1, wherein the encoding of said original fingerprint is an error correction encoding procedure.

4. An apparatus for verifying the integrity of an original document having original information, said apparatus comprising:

for initializing said genuine document for possible future verification:
 a) a hasher to hash said original information into a fingerprint using a one-way hash function;
 b) an encoder to encode said fingerprint into a plurality of original fingerprint pieces;
 c) a distributor to distribute said original fingerprint pieces to a plurality of locations with each of said locations receiving at least one of said original fingerprint pieces;

for verifying the integrity of a test document purported to be said genuine document and having said test information;
 d) a retriever for retrieving a first number of test fingerprint pieces purported to be said original fingerprint pieces from a plurality of said locations;
 e) a decoder for decoding at least a predetermined number of said first number of test fingerprint pieces into a first test fingerprint;
 f) said hasher also hashing said test information into a second test fingerprint using said hash function;
 g) a comparator to compare said first test fingerprint with said second test fingerprint and accepting said test document as being said genuine document if said first test fingerprint equals said second test fingerprint.

5. In a computer system having a plurality of servers and at least one user terminal electronically connected to said servers, a method of verifying the integrity of an original original having original information, comprising:

when initializing said original document for possible future verification:
 a) hashing said original information into a fingerprint using a one-way hash function;
 b) encoding said fingerprint into a plurality of original fingerprint pieces;
 c) distributing said original fingerprint pieces to said servers with each of a number of said servers receiving at least one of said original fingerprint pieces;

when verifying the integrity of a test document purported to be said genuine document and having test information:
 d) retrieving a first number of test fingerprint pieces purported to be said original fingerprint pieces from a plurality of said servers;
 e) decoding at least a predetermined number of said first number of test fingerprint pieces into a first test fingerprint;
 f) hashing said test information into a second test fingerprint using said hash function; and
 g) comparing said first test fingerprint with said second test fingerprint and accepting said test document as being said genuine document if said first test fingerprint equals said second test fingerprint.

6. A method as recited in claim 5, wherein said original document is stored in a centralized memory of said server.

7. A method as recited in claim 5, wherein said document is a computer program.

8. A method as recited in claim 5, wherein said document is executable computer code.

9. A method as recited in claim 5, wherein said document is replicated and a number of copies of said document is stored into a number of said terminals of said computer system.

10. A method as recited in claim 5, wherein said document is partitioned into a number of partitions, each of which is stored in one of said terminals.

11. A method as recited in claim 3, wherein the error correction encoding procedure is a replication code.

\* \* \* \* \*